US011827088B2

(12) United States Patent
Dingman et al.

(10) Patent No.: US 11,827,088 B2
(45) Date of Patent: Nov. 28, 2023

(54) BATTERY PACK HOUSING INCLUDING LATERAL BASEPLATE, LONGITUDINAL BASEPLATE, AND BRACKET THAT TRANSFERS FRONT IMPACT LOADS FROM LATERAL BASEPLATE TO LONGITUDINAL BASEPLATE

(71) Applicant: GM GLOBAL TECHNOLOGY OPERATIONS LLC, Detroit, MI (US)

(72) Inventors: Mark T. Dingman, Royal Oak, MI (US); Daniel F. Witting, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 143 days.

(21) Appl. No.: 17/468,195

(22) Filed: Sep. 7, 2021

(65) Prior Publication Data
US 2023/0076964 A1 Mar. 9, 2023

(51) Int. Cl.
*B60K 1/04* (2019.01)
*B60L 50/64* (2019.01)

(52) U.S. Cl.
CPC .............. *B60K 1/04* (2013.01); *B60L 50/64* (2019.02); *B60K 2001/0438* (2013.01)

(58) Field of Classification Search
CPC .... B60K 1/04; B60K 2001/0438; B60L 50/64
See application file for complete search history.

(56) References Cited

U.S. PATENT DOCUMENTS

2021/0091352 A1* 3/2021 Weicker
2021/0179193 A1* 6/2021 Kim

FOREIGN PATENT DOCUMENTS

EP 4063158 A1 * 3/2021
WO WO 2013038255 A2 * 3/2013

OTHER PUBLICATIONS

On-line article titled "New Jaguar I-Pace's battery electric vehicle technology at a glance" by Matt Burt, Nov. 15, 2016; URL: https://www.autocar.co.uk/car-news/motor-shows-la-motor-show/new-jaguar-i-pace%E2%80%99s-battery-electric-vehicle-technology-glance.

* cited by examiner

*Primary Examiner* — James A Shriver, II
*Assistant Examiner* — Nicholas R. Kandas

(57) ABSTRACT

A housing for a battery pack of a vehicle is described herein. The housing includes a lateral baseplate, a central longitudinal baseplate, and at least one bracket. The lateral baseplate is configured to extend in a lateral direction of the vehicle and attach to a front cradle of the vehicle rearward of left and right body mount seats on the front cradle. The central longitudinal baseplate is configured to extend in a longitudinal direction of the vehicle and attach to the lateral baseplate. The at least one bracket is configured to connect the central longitudinal baseplate to the lateral baseplate and to form an angle with the lateral baseplate that is greater than 40 degrees.

17 Claims, 3 Drawing Sheets

BATTERY PACK HOUSING INCLUDING LATERAL BASEPLATE, LONGITUDINAL BASEPLATE, AND BRACKET THAT TRANSFERS FRONT IMPACT LOADS FROM LATERAL BASEPLATE TO LONGITUDINAL BASEPLATE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery pack housings including a lateral baseplate, a longitudinal baseplate, and a bracket that transfers from impact loads from the lateral baseplate to the longitudinal baseplate.

An electric vehicle includes one or more electric motors and a battery pack that supplies power to electric motors. The battery pack is typically located rearward of a front cradle of the electric vehicle and forward of a rear cradle of the electric vehicle. The battery pack includes a plurality of battery modules and a housing that extends around the battery modules and holds the battery modules in place. The housing protects the battery modules in the event that the electric vehicle is involved in an impact.

SUMMARY

A housing for a battery pack of a vehicle is described herein. An example of such a housing according to the present disclosure includes a lateral baseplate, a central longitudinal baseplate, and at least one bracket. The lateral baseplate is configured to extend in a lateral direction of the vehicle and attach to a front cradle of the vehicle rearward of left and right body mount seats on the front cradle. The central longitudinal baseplate is configured to extend in a longitudinal direction of the vehicle and attach to the lateral baseplate. The at least one bracket is configured to connect the central longitudinal baseplate to the lateral baseplate and to form an angle with the lateral baseplate that is greater than 40 degrees.

In one aspect, the at least one bracket connects the central longitudinal baseplate to the lateral baseplate at a location that is directly rearward of at least one of the left and right body mount seats on the front cradle.

In one aspect, the at least one bracket includes a left bracket and a right bracket. The left bracket connects the central longitudinal baseplate to the lateral baseplate at a location that is directly rearward of the left body mount seat. The right bracket connects the central longitudinal baseplate to the lateral baseplate at a location that is directly rearward of the right body mount seat.

In one aspect, the at least one bracket has a triangular shape with a first edge attached to the lateral baseplate, a second edge attached to the central longitudinal baseplate, and a third edge forming the angle with the lateral baseplate.

In one aspect, the at least one bracket includes a triangular-shaped interior boss that is raised relative to the first, second, and third edges.

In one aspect, the at least one bracket is configured to be disposed above at least one of a plurality of battery modules in the battery pack.

In one aspect, the lateral baseplate extends from a left side of the battery pack to a right side of the battery pack and forms a front end of the battery pack.

In one aspect, the central longitudinal baseplate is attached to the lateral baseplate at a midpoint thereof and is disposed midway between the left and right sides of the battery pack.

In one aspect, the housing further includes a left longitudinal baseplate and a right longitudinal baseplate. The left longitudinal baseplate is configured to extend in the longitudinal direction and attach to the lateral baseplate at the left side of the battery pack. The right longitudinal baseplate is configured to extend in the longitudinal direction and attach to the lateral baseplate at the right side of the battery pack.

In one aspect, the housing further includes a first set of dividers and a second set of dividers. The first set of dividers extends from the left longitudinal baseplate to the central longitudinal baseplate and is configured to be disposed between adjacent ones of a first subset of a plurality of battery modules in the battery pack. The second set of dividers extends from the right longitudinal baseplate to the central longitudinal baseplate and is configured to be disposed between adjacent ones of a second subset of the plurality of battery modules.

Another example of a battery pack housing according to the present disclosure includes a lateral baseplate, a left longitudinal baseplate, a right longitudinal baseplate, a central longitudinal baseplate, a left bracket, and a right bracket. The lateral baseplate is configured to extend in a lateral direction of a vehicle and attach to a front cradle of the vehicle rearward of left and right body mount seats on the front cradle. The lateral baseplate extends from a left side of the battery pack to a right side of the battery pack and forms a front end of the battery pack. The left longitudinal baseplate is configured to extend in a longitudinal direction of the vehicle and attach to the lateral baseplate at the left side of the battery pack. The right longitudinal baseplate is configured to extend in the longitudinal direction of the vehicle and attach to the lateral baseplate at the right side of the battery pack. The central longitudinal baseplate is configured to extend in the longitudinal direction of the vehicle and attach to the lateral baseplate midway between the left and right sides of the battery pack. The left bracket connects the central longitudinal baseplate to the lateral baseplate at a location that is directly rearward of the left body mount seat. The right bracket connects the central longitudinal baseplate to the lateral baseplate at a location that is directly rearward of the right body mount seat. Each of the left and right brackets form an angle with the lateral baseplate that is greater than 40 degrees.

In one aspect, each of the left and right brackets has a triangular shape with a first edge attached to the lateral baseplate, a second edge attached to the central longitudinal baseplate, and a third edge forming the angle with the lateral baseplate.

In one aspect, each of the left and right brackets includes a triangular-shaped interior boss that is raised relative to the first, second, and third edges.

In one aspect, each of the left and right brackets is configured to be disposed directly above at least one of a plurality of battery modules in the battery pack.

In one aspect, the lateral baseplate and the left, right, and central longitudinal baseplates have top surfaces that are disposed within a plane, and the left and right brackets are disposed one of within and above the plane.

An example of a vehicle structure according to the present disclosure includes a front cradle and a battery pack housing.

The front cradle includes left and right frame rails configured to extend in a longitudinal direction of a vehicle, at least one crossbar connecting the left and right frame rails to one another and configured to extend in a lateral direction of the vehicle, a left body mount seat disposed on a top surface of the left frame rail adjacent to a rear end thereof, and a right body mount seat disposed on the top surface of the right frame rail adjacent to the rear end thereof. The battery pack housing includes a lateral baseplate configured to extend in the lateral direction of the vehicle and attach to the front cradle rearward of the left and right body mount seats, a central longitudinal baseplate configured to extend in the longitudinal direction of the vehicle and attach to the lateral baseplate, and at least one bracket configured to connect the central longitudinal baseplate to the lateral baseplate and to form an angle with the lateral baseplate that is greater than 40 degrees.

In one aspect, the at least one bracket has a triangular shape with a first edge attached to the lateral baseplate, a second edge attached to the central longitudinal baseplate, and a third edge forming the angle with the lateral baseplate.

In one aspect, the at least one bracket includes a triangular-shaped interior boss that is raised relative to the first, second, and third edges.

In one aspect, the vehicle structure further includes a plurality of floor panel supports disposed on the top surface of at least one of the lateral baseplate and the central longitudinal baseplate, and a floor panel configured to be attached to the battery pack housing at the plurality of floor panel supports. The floor panel includes a raised pocket configured to receive the triangular-shaped interior boss on the at least one bracket.

In one aspect, the vehicle structure further includes left and right rocker panels configured to be disposed outboard of the battery pack housing in the lateral direction of the vehicle, and a body torque box connecting the left and right rocker panels to the left and rail frame rails of the front cradle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A housing of a battery typically includes front and rear lateral baseplates that form the front and rear ends of the battery pack and left and right longitudinal baseplates that form the left and right sides of the battery pack. The lateral baseplates extend in a lateral (side-to-side) direction of a vehicle, and the longitudinal baseplates extend in a longitudinal (fore-aft) direction of the vehicle. The battery pack housing also typically includes dividers that extend in the lateral direction and separate adjacent rows of battery modules from one another.

The front lateral baseplate is typically attached to the rear end of the front cradle so that front impact loads acting on the front cradle are transmitted to the front lateral baseplate. In addition, the battery pack housing may be designed so that front impact loads are transmitted from the front lateral baseplate to the longitudinal baseplates rather than to the battery modules. For example, the longitudinal baseplates may connect to the lateral baseplate at locations that are laterally aligned with the frame rails of the front cradle, and project rearward and laterally outward from these locations to the left and right sides of the battery pack. However, this bend in the forward sections of the longitudinal baseplates reduces the packaging space available for the battery modules relative to if the longitudinal baseplates remained straight along the entire left and right sides of the battery pack.

To address this issue, the length of the lateral baseplate may be approximately equal to the width of the battery pack, and the longitudinal baseplates may extend straight back from the left and right ends of the lateral baseplate. In addition, a central longitudinal baseplate may extend straight back from the lateral baseplate along the centerline of the battery pack. However, in this configuration, the longitudinal baseplates are not laterally aligned with the frame rails of the front cradle, which decreases the amount of front impact loads transferred from the front lateral baseplate to the longitudinal baseplates. Thus, additional structure may be needed at the front end of the battery pack to withstand the front impact loads, which would decrease the packaging space of the battery modules.

A battery pack housing according to the present disclosure is similar to the battery pack housing described immediately above except that it includes brackets connecting the central longitudinal baseplate to the front lateral baseplate. The brackets connect to the front lateral baseplates at locations that are laterally aligned with the left and right frame rails. In addition, the rearward edges of the brackets form an angle with the front lateral baseplate that is sufficient to transmit enough front impact loads to the central longitudinal baseplate to avoid the need to add structure the front end of the battery pack.

Figure 1:
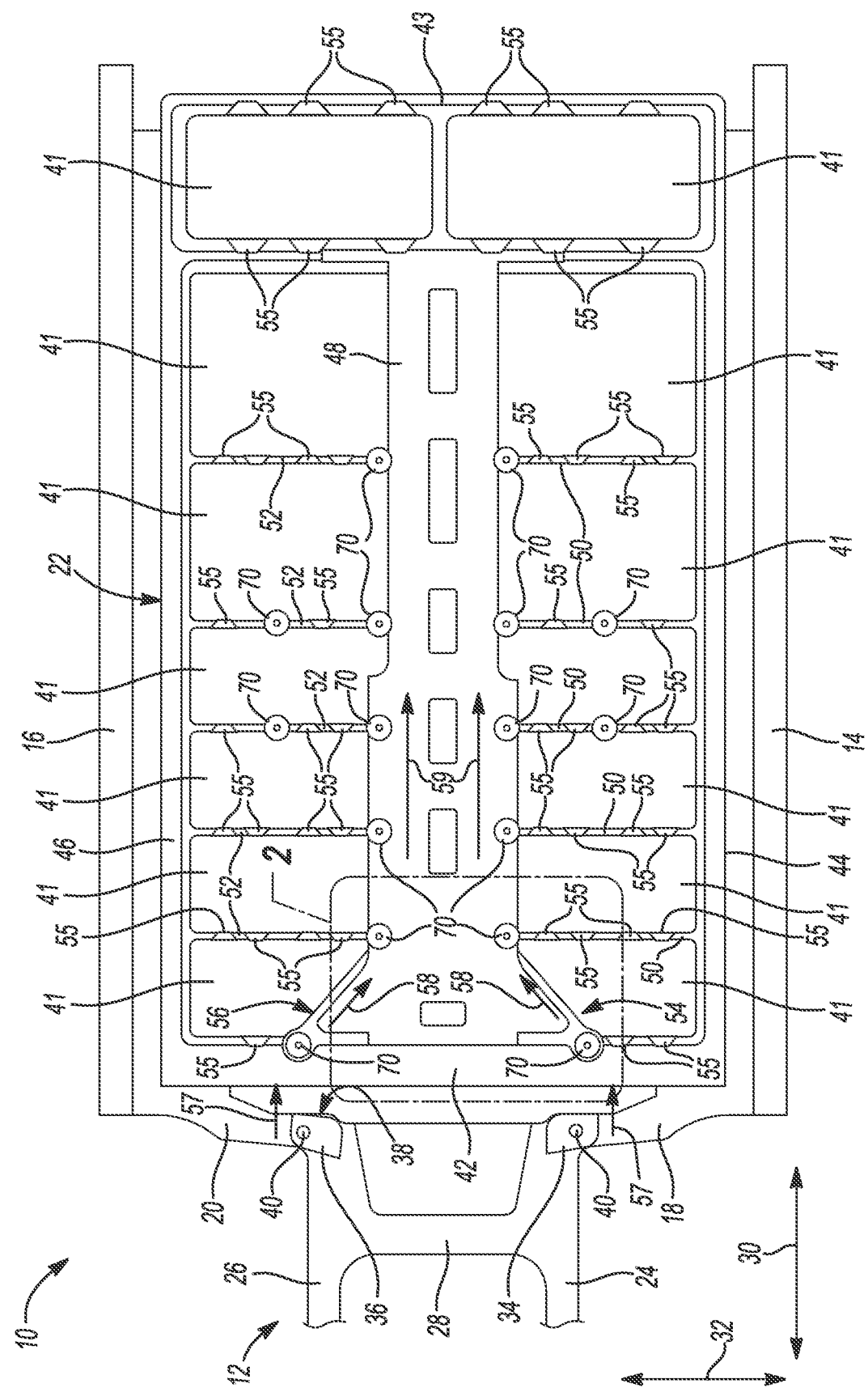
FIG. 1 is a top view of a vehicle structure including a front cradle and a battery pack housing according to the present disclosure.
Figure 2:
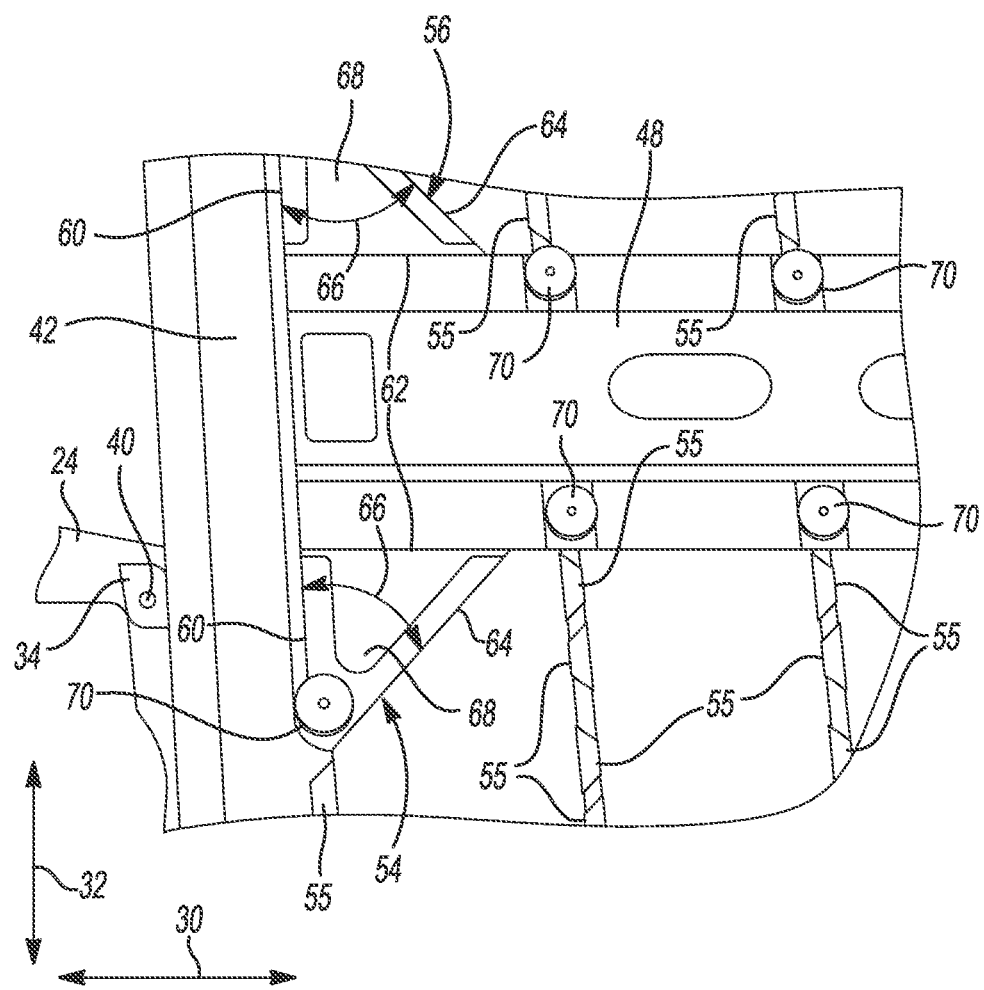
FIG. 2 is an enlarged view of a portion of the battery pack housing of FIG. 1 within a rectangle 2.

Referring now to FIGS. 1 and 2, a vehicle structure 10 includes a front cradle 12, a left side sill or rocker panel 14, a right side sill or rocker panel 16, a left body torque box 18, a right body torque box 20, and a battery pack housing 22. The front cradle 12 includes a left frame rail 24, a right frame rail 26, and a crossbar 28 that connects the left and right frame rails 24 and 26 to one another. When assembled to a vehicle, the left and right frame rails 24 and 26 extend in a longitudinal (fore-aft) direction 30 of the vehicle, and the crossbar 28 extends in a lateral (side-to-side) direction 32 of the vehicle.

The front cradle 12 also includes a left body mount seat 34 and a right body mount seat 36. The left body mount seat 34 is disposed on the top surface of the left frame rail 24 adjacent to a rear end 38 of the front cradle 12. The right body mount seat 36 is disposed on the top surface of the right frame rail 26 adjacent to the rear end 38 of the front cradle 12. The left and right body mount seats 34 and 36 are raised relative to the adjacent top surfaces of the left and right frame rails 24 and 26, respectively. Each of the left and right body mount seats 34 and 36 defines a mounting hole 40 configured to receive a body mount fastener (not shown).

The battery pack housing 22 extends around a plurality of battery modules 41 and holds the battery modules 41 in place. The battery pack housing 22 includes a front lateral baseplate 42, a rear lateral baseplate 43, a left longitudinal baseplate 44, a right longitudinal baseplate 46, a central longitudinal baseplate 48, a first set of dividers 50, and a second set of dividers 52, a left bracket 54, and a right bracket 56. When assembled to the vehicle, the lateral baseplates 42, 43 and the dividers 50, 52 extend in the lateral direction 32, and the longitudinal baseplates 44, 46, 48 extend in the longitudinal direction 30.

The front lateral baseplate 42 is attached (e.g., fastened) to the left and right frame rails 24 and 26 of the front cradle 12. The longitudinal baseplates 44, 46, 48 are attached (e.g., fastened) to the front lateral baseplate 42. The left and right brackets 54 and 56 may be formed separate from one or both of the front lateral baseplate 42 and the central longitudinal baseplate 48 and attached (e.g., fastened, welded) thereto. Alternatively, the left and right brackets 44 and 46 may be formed integral with one of the front lateral baseplate 42 and the central longitudinal baseplate 48 and attached to the other one of the front lateral baseplate 42 and the central longitudinal baseplate 48.

The battery pack housing 22 and the battery modules 41 form at least part of a battery pack. The left and right longitudinal baseplates 44 and 46 form the left and right sides of the battery pack. The front and rear lateral baseplates 42 and 43 extend from the left side of the battery pack to the right side of the battery pack and form the front and rear ends of the battery pack, respectively. The left and right longitudinal baseplates 44 and 46 are attached to the front lateral baseplate 42 the left and right sides of the battery pack, respectively. The central longitudinal baseplate 48 is attached to the front lateral baseplate 42 at the midpoint thereof and is disposed midway between the left and right sides of the battery pack.

The dividers 50 extend from the left longitudinal baseplate 44 to the central longitudinal baseplate 48. The dividers 50 are disposed between adjacent ones of a first subset of the battery modules 41 located on the left side of the battery pack. The dividers 52 extend from the right longitudinal baseplate 46 to the central longitudinal baseplate 48. The dividers 52 are disposed between adjacent ones of a second subset of the battery modules 41 disposed on the left side of the battery pack. The battery modules 41 include mounting tabs 55 that extend over the lateral baseplates 42, 43 and the dividers 50, 55 and are attached (e.g., fastened) thereto.

The left bracket 54 connects the central longitudinal baseplate 48 to the front lateral baseplate 42 at a location that is directly rearward of the left body mount seat 34 (i.e., a location that is rearward of the left body mount seat 34 and aligned with the left body mount seat 34 in the lateral direction 32). The right bracket 56 connects the central longitudinal baseplate 48 to the front lateral baseplate 42 at a location that is directly rearward of the right body mount seat 36 (i.e., a location that is rearward of the left body mount seat 36 and aligned with the right body mount seat 36 in the lateral direction 32).

The left and right brackets 54 and 56 distribute front impact loads from the front lateral baseplate 42 to the central longitudinal baseplate 48. Front impact loads acting on the front cradle 12 are transmitted to and through the battery pack housing 22 along a first load path 57, a second load path 58, and a third load path 59. The first load path 57 extends in a rearward direction from the front cradle 12 to the front lateral baseplate 42. The second load path 58 extends in a rearward and laterally inward direction from the front lateral baseplate 42 to the central longitudinal baseplate 48 through the left and right brackets 54 and 56. The third load path 59 extends in a rearward direction through the central longitudinal baseplate 48.

In addition, the left and right brackets 54 and 56 do not project into the packaging space for the battery modules 41. Instead, each of the left and right brackets 54 and 56 is disposed directly above one of the battery modules 41. In one example, the top surfaces of the front lateral baseplate 42 and the longitudinal baseplates 44, 46, 48 are disposed within a plane, and the left and right brackets 54 and 56 are disposed within or above the plane. Thus, the number and size of the battery modules 41 does not need to be decreased due to the presence of the left and right brackets 54 and 56.

With specific reference to FIG. 2, each of the left and right bracket 54 and 56 has a triangular shape with a first edge 60, a second edge 62, and a third edge 64. The first edge 60 is attached to the front lateral baseplate 42. The second edge 62 attached to the central longitudinal baseplate 48. The third edge 64 forms an angle 66 with the front lateral baseplate 42. The angle 66 is greater than 40 degrees so that the left and right bracket 54 and 56 transmit a sufficient amount of front impact loads to the central longitudinal baseplate 48.

Each of the left and right bracket 54 and 56 includes a triangular-shaped interior boss 68 that is raised relative to the first, second, and third edges 60, 62, and 64. The interior bosses 68 increase the strength of the left and right brackets 54 and 56. In various implementations, the interior bosses 68 may have a shape other than triangular such as an elongated rib shape, and each of the left and right brackets 54 and 56 may include more than one of the interior bosses 68.

The battery pack housing 22 also includes a plurality of floor panel supports 70 disposed in the top surface(s) one or more of the front lateral faceplate 42, the central longitudinal faceplate 48, the dividers 50, 52, and the brackets 54, 56. In the example shown in FIGS. 1 and 2, six of the floor panel supports 70 are disposed on the top surface of the central longitudinal faceplate 48, and eight of the floor panel supports 70 are disposed on the top surfaces of the dividers 50, 52. In addition, one floor panel support 70 is disposed on the top surfaces of the front lateral baseplate 42 and the left bracket 54, and another floor panel support 70 is disposed on the top surfaces of the front lateral baseplate 42 and the right bracket 56.

Figure 3:
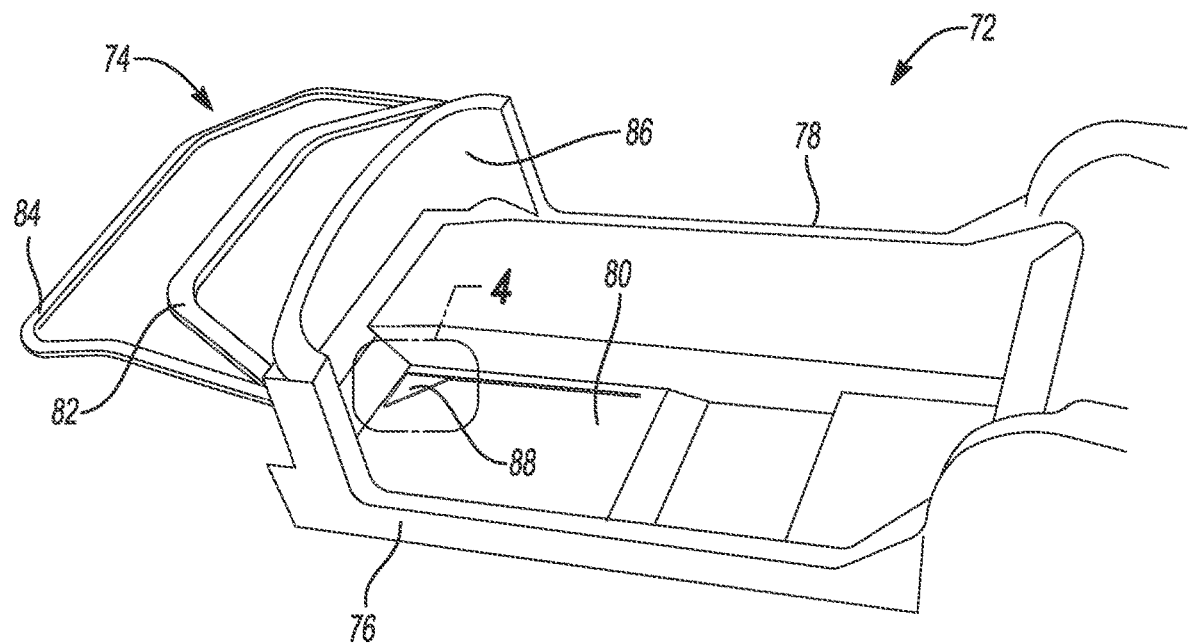
FIG. 3 is a perspective view of a vehicle body structure according to the present disclosure.
Figure 4:
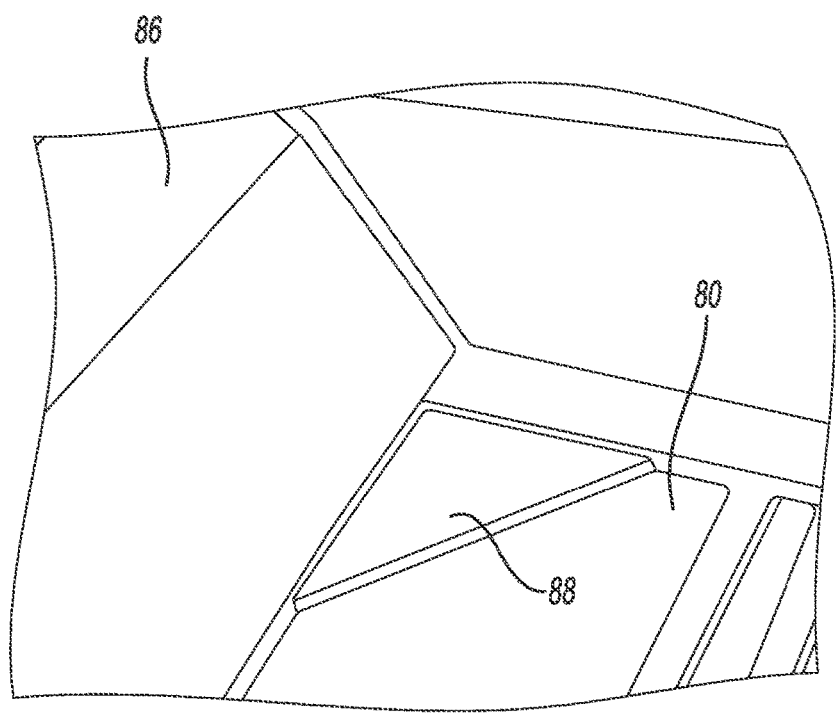
FIG. 4 is an enlarged view of a portion of the vehicle body structure of FIG. 3 within a rectangle 4.

Referring now to FIGS. 3 and 4, a vehicle body structure 72 may be mounted to the front cradle 12 and the battery pack housing 22 at the body mount seats 40 and the floor panel supports 70. The vehicle body structure 72 includes a front end structure 74, a left side panel 76, a right side panel 78, and a floor panel 80. The front end structure 74 includes an inner rail 82, an outer rail 84, and a vertical wall 86. The outer rail 84 forms the perimeter of the front end structure 74. The inner rail 82 is disposed rearward of the outer rail 84. The vertical wall 86 separates an engine compartment from a passenger compartment. The front end structure 74 also includes a frame (not shown) that rests on the body mounts seats 40 and connects the outer and inner rails 82 and 84 to the front cradle 12.

The left side panel 76 is attached to the left side of the floor panel 80. The right side panel 78 is attached to the right side of the floor panel 80. The left side panel 76, the right side panel 78, and the vertical wall 86 may be formed integral with the floor panel 80 or formed separate from the floor panel 80 and attached thereto.

With specific reference to FIG. 4, the floor panel 80 includes a pair of raised pockets 88 (only one shown). Each raised pocket 88 is shaped, sized, and located to receive one of the interior bosses 68 on the left and right brackets 54 and 56. For example, each raised pocket 88 may have a triangular shape, and each raised pocket 88 may be slightly larger than each interior boss 68. The raised pockets 88 are raised from the adjacent top surfaces of the floor panel 80 by a minimum amount necessary to accommodate the interior bosses 68. In turn, the presence of the left and right brackets 54 and 56 has minimal impact on the leg room of a passenger in the vehicle.

The vehicle body structure 72 shown in FIGS. 3 and 4 may be considered part of the vehicle structure 10 shown in FIGS. 1 and 2. In addition, the vehicle structure 10 may also include a battery pack cover (not shown) that is disposed between the battery pack housing 22 and the floor panel 80. The battery pack cover may include a pair of raised pockets that are similar in shape, size, and location to the raised pockets 88 so that the raised pockets on the battery pack cover fit between the interior bosses 68 on the brackets 54, 56 and the raised pockets 88.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A housing for a battery pack of a vehicle, the housing comprising:
    a lateral baseplate configured to extend in a lateral direction of the vehicle, a left longitudinal baseplate extending from the lateral baseplate at a left side of the battery pack and configured to extend in a longitudinal direction of the vehicle, and a right longitudinal baseplate extending from the lateral baseplate at a right side of the battery pack and configured to extend in the longitudinal direction of the vehicle, the lateral baseplate extending entirely across the housing from the left longitudinal baseplate to the right longitudinal baseplate, the lateral baseplate configured to attach to a front cradle of the vehicle rearward of both a left body mount seat on top of a left frame rail of the front cradle and a right body mount seat on top of a right frame rail of the front cradle;
    a central longitudinal baseplate configured to extend in the longitudinal direction of the vehicle and attach to the lateral baseplate; and
    at least one bracket configured to connect the central longitudinal baseplate to the lateral baseplate and to form an angle with the lateral baseplate that is greater than 40 degrees.

2. The housing of claim 1 wherein the at least one bracket connects the central longitudinal baseplate to the lateral baseplate at a location that is directly rearward of at least one of the left and right body mount seats on the front cradle.

3. The housing of claim 1 wherein the at least one bracket includes a left bracket and a right bracket, the left bracket connecting the central longitudinal baseplate to the lateral baseplate at a location that is directly rearward of the left body mount seat, the right bracket connecting the central longitudinal baseplate to the lateral baseplate at a location that is directly rearward of the right body mount seat.

4. The housing of claim 1 wherein the at least one bracket has a triangular shape with a first edge attached to the lateral baseplate, a second edge attached to the central longitudinal baseplate, and a third edge forming the angle with the lateral baseplate.

5. The housing of claim 1 wherein the at least one bracket includes a triangular-shaped interior boss that is raised relative to the first, second, and third edges.

6. The housing of claim 1 wherein the at least one bracket is configured to be disposed above at least one of a plurality of battery modules in the battery pack.

7. The housing of claim 1 wherein the lateral baseplate extends from a left side of the battery pack to a right side of the battery pack and forms a front end of the battery pack.

8. The housing of claim 7 wherein the central longitudinal baseplate is attached to the lateral baseplate at a midpoint thereof and is disposed midway between the left and right sides of the battery pack.

9. The housing of claim 1 further comprising:
    a first set of dividers extending from the left longitudinal baseplate to the central longitudinal baseplate and configured to be disposed between a first subset of a plurality of battery modules in the battery pack; and
    a second set of dividers extending from the right longitudinal baseplate to the central longitudinal baseplate and configured to be disposed between a second subset of the plurality of battery modules.

10. A housing for a battery pack of a vehicle, the housing comprising:
    a lateral baseplate configured to extend in a lateral direction of the vehicle and attach to a front cradle of the vehicle rearward of both a left body mount seat on top of a left frame rail of the front cradle and a right body mount seat on top of a right frame rail of the front cradle, the lateral baseplate extending from a left side of the battery pack to a right side of the battery pack and forming a front end of the battery pack;

a left longitudinal baseplate configured to extend in a longitudinal direction of the vehicle and attach to the lateral baseplate at the left side of the battery pack;

a right longitudinal baseplate configured to extend in the longitudinal direction of the vehicle and attach to the lateral baseplate at the right side of the battery pack, the lateral baseplate extends entirely across the housing from the left longitudinal baseplate to the right longitudinal baseplate;

a central longitudinal baseplate configured to extend in the longitudinal direction of the vehicle and attach to the lateral baseplate midway between the left and right sides of the battery pack;

a left bracket connecting the central longitudinal baseplate to the lateral baseplate at a location that is directly rearward of the left body mount seat, the left bracket including a left floor panel support configured to support a floor panel of the vehicle; and a right bracket connecting the central longitudinal baseplate to the lateral baseplate at a location that is directly rearward of the right body mount seat, the right bracket including a right floor panel support configured to support the floor panel of the vehicle, each of the left and right brackets forming an angle with the lateral baseplate that is greater than 40 degrees;

wherein each one of the left bracket and the right bracket is mounted above at least one of a plurality of battery modules of the battery pack.

11. The housing of claim 10 wherein each of the left and right brackets has a triangular shape with a first edge attached to the lateral baseplate, a second edge attached to the central longitudinal baseplate, and a third edge forming the angle with the lateral baseplate.

12. The housing of claim 11 each of the left and right brackets includes a triangular-shaped interior boss that is raised relative to the first, second, and third edges.

13. The housing of claim 10 wherein the lateral baseplate and the left, right, and central longitudinal baseplates have top surfaces that are disposed within a plane, and the left and right brackets are disposed one of within and above the plane.

14. A vehicle structure comprising:

a front cradle including left and right frame rails configured to extend in a longitudinal direction of a vehicle, at least one crossbar connecting the left and right frame rails to one another and configured to extend in a lateral direction of the vehicle, a left body mount seat disposed on a top surface of the left frame rail adjacent to a rear end thereof, and a right body mount seat disposed on the top surface of the right frame rail adjacent to the rear end thereof;

a battery pack housing including a lateral baseplate configured to extend in the lateral direction of the vehicle and attach to the front cradle rearward of the left and right body mount seats, a central longitudinal baseplate configured to extend in the longitudinal direction of the vehicle and attach to the lateral baseplate, and at least one bracket configured to connect the central longitudinal baseplate to the lateral baseplate and to form an angle with the lateral baseplate that is greater than 40 degrees, the at least one bracket has a triangular shape and includes a triangular-shaped interior boss;

a plurality of floor panel supports disposed on top of at least one of the lateral baseplate and the central longitudinal baseplate; and a floor panel configured to be attached to the battery pack housing at the plurality of floor panel supports, the floor panel including a raised, triangular pocket configured to receive the triangular-shaped interior boss on the at least one bracket.

15. The vehicle structure of claim 14 wherein the at least one bracket includes a first edge attached to the lateral baseplate, a second edge attached to the central longitudinal baseplate, and a third edge forming the angle with the lateral baseplate.

16. The vehicle structure of claim 15, wherein the triangular-shaped interior boss that is raised relative to the first, second, and third edges.

17. The vehicle structure of claim 14 further comprising:

left and right rocker panels configured to be disposed outboard of the battery pack housing in the lateral direction of the vehicle; and a body torque box connecting the left and right rocker panels to the left and right frame rails of the front cradle.

* * * * *